June 2, 1964 W. J. SCOTT 3,135,537
FLUID CONDUIT CONNECTOR
Filed July 25, 1958 3 Sheets-Sheet 1
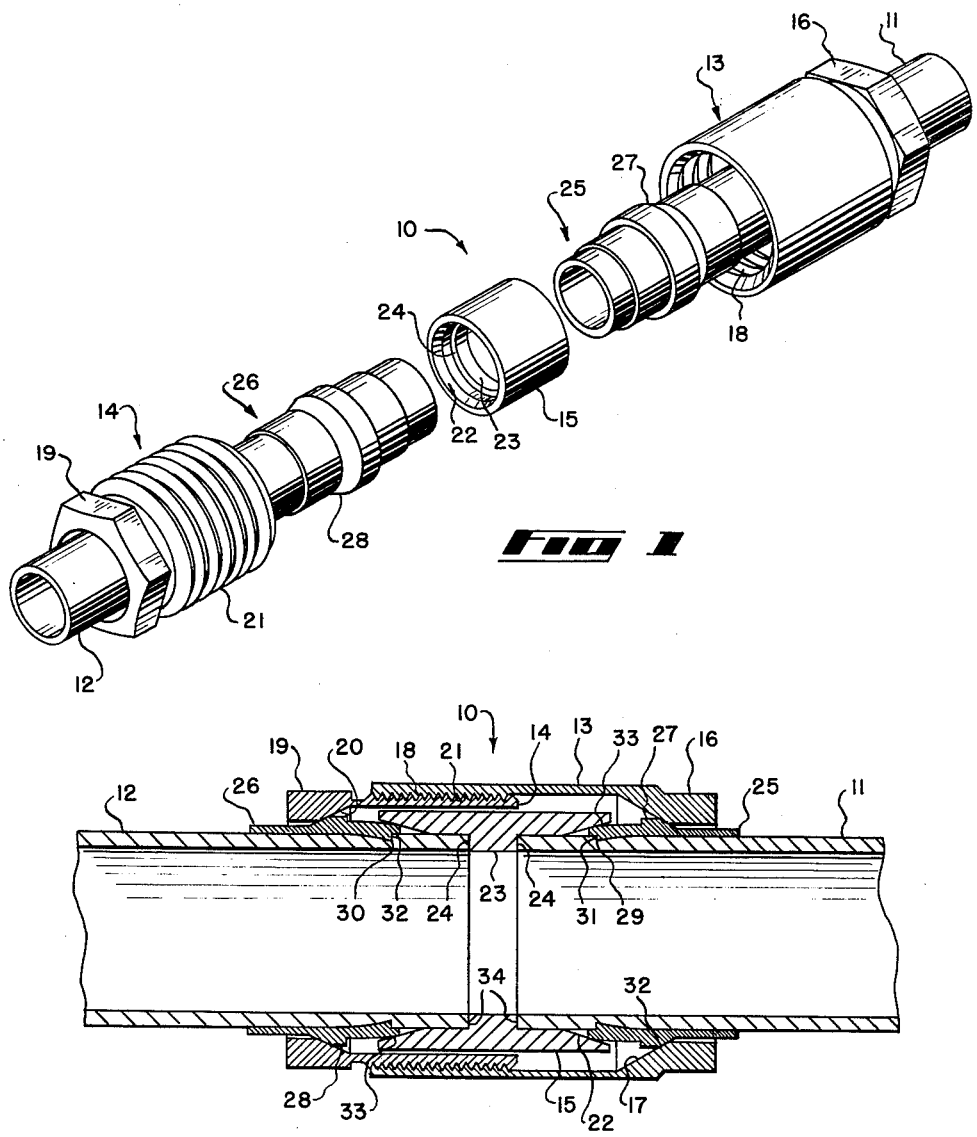
INVENTOR.
WILLIAM J. SCOTT
BY
Walter J. Jason
ATTORNEY

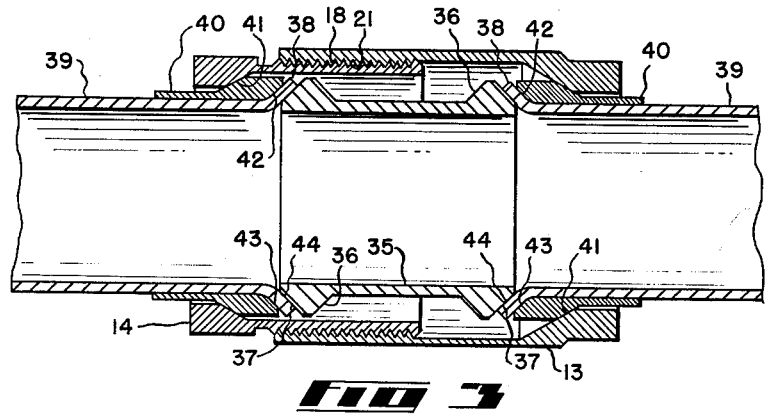
Fig. 3
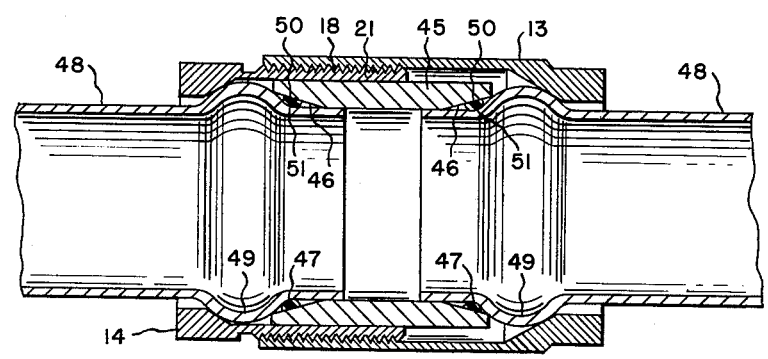
Fig. 4
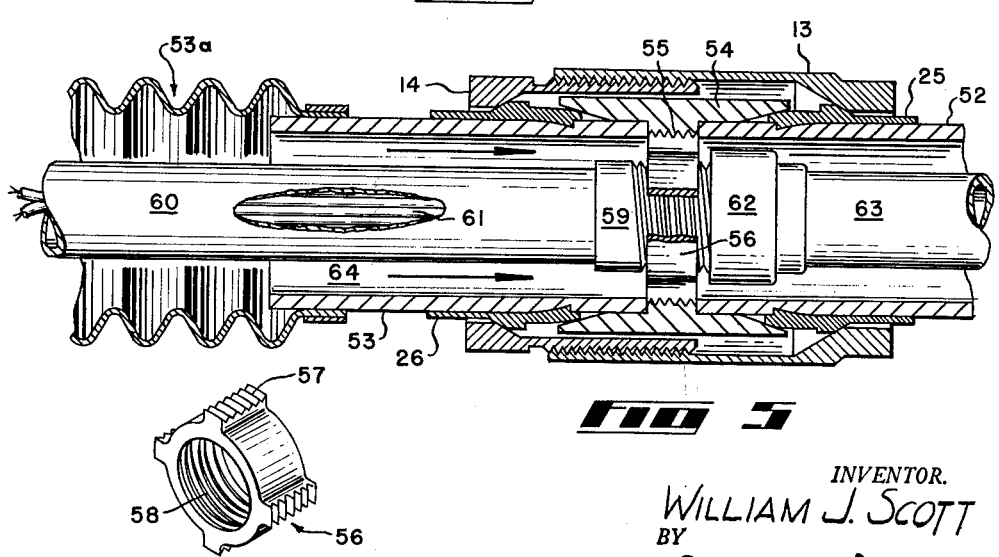
Fig. 5
Fig. 6
INVENTOR.
WILLIAM J. SCOTT
BY
ATTORNEY June 2, 1964
W. J. SCOTT
3,135,537
FLUID CONDUIT CONNECTOR
Filed July 25, 1958
3 Sheets-Sheet 3
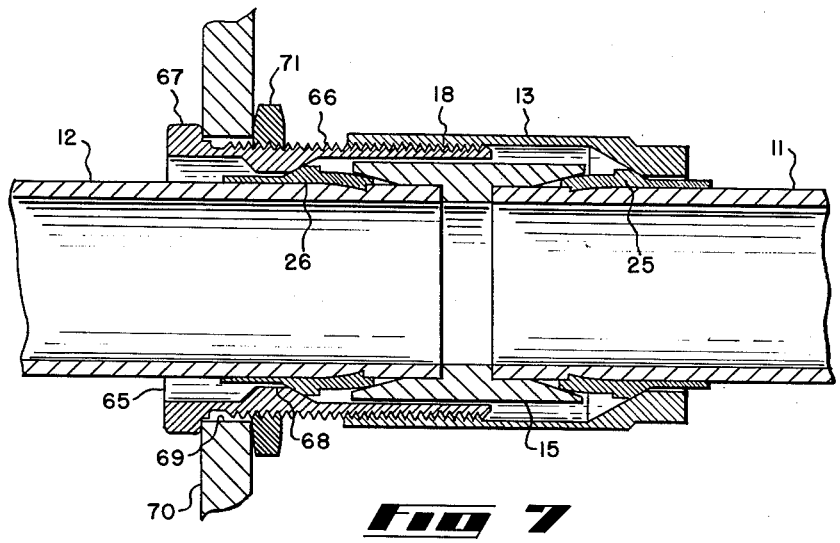
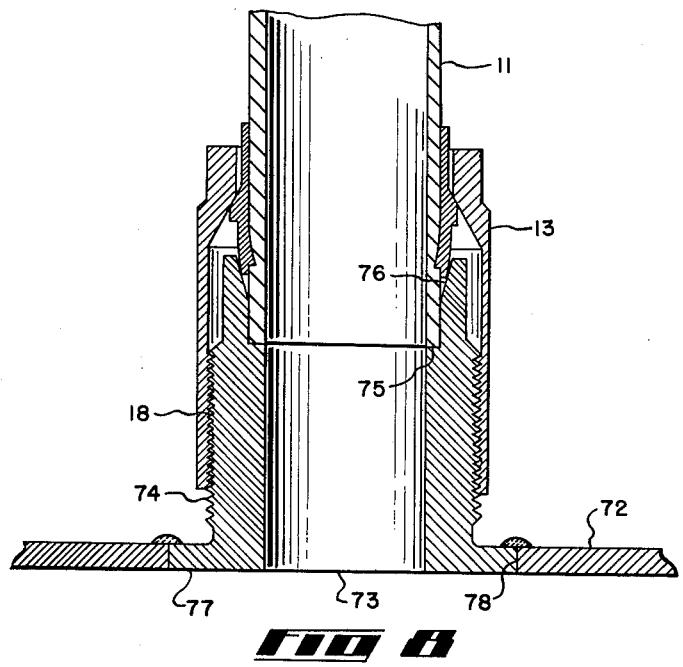
INVENTOR.
WILLIAM J. SCOTT
BY
ATTORNEY United States Patent Office 3,135,537
Patented June 2, 1964

3,135,537
FLUID CONDUIT CONNECTOR
William J. Scott, Fort Worth, Tex., assignor to General Dynamics Corporation, San Diego, Calif., a corporation of Delaware
Filed July 25, 1958, Ser. No. 750,993
1 Claim. (Cl. 285—341)

The present invention relates generally to fluid conduit coupling devices and more particularly to improved coupling devices for connecting conduits having various end types.

In the known art there are generally available three different types of fluid conduit coupling devices. Amongst the various types there is the type for coupling together conduits having flared ends, the type for joining conduits having beaded ends, and the type for connecting flareless conduits. Of the three above mentioned types of conduits the first two are generally more widely used.

Although, in general, a satisfactory juncture is obtained with both the flared and beaded type conduit coupling devices both such coupling devices have certain inherent disadvantages. In preparing the conduit sections or tubes for these type couplings, the yield strength of the material must perforce be exceeded, thereby damaging the structural integrity of the tubing material in the area of the flare or bead. And, since the diameter of the conduit section is increased in the area of the flare or bead, a larger and, consequently, heavier coupling device must be employed. A further disadvantage is that, because of the conduit deformation, there is, in many cases, an undesirable disruption to the flow of the fluid within the conduit in the area of the coupling device. This is especially true in the case of the beaded type of conduit coupling.

The flareless type conduit coupling device has several inherent advantages over the flared and beaded type conduit couplings. The structural integrity of the conduit sections are fully retained, and since there is no enlargement of the conduit, a smaller, lighter coupling may be employed. Further, there is a minimum amount of fluid flow disruption engendered thereby.

Heretofore several devices have been evolved for the purpose of coupling together sections of conduits having the above mentioned end configurations. Of the conduit coupling devices presently available, each is designed to accommodate but a single type of conduit. In most cases such coupling devices, especially those for connecting flareless conduits, are unduly heavy and large, which makes them undesirable, if not altogether unsatisfactory, for use in the conduit systems of high-performance aircraft, missiles, and space craft where even a small weight-saving is of the utmost importance. In some cases such coupling devices comprise an excessive number of detail parts, which make them unduly complicated, large and difficult to install.

The present invention offers several distinct and outstanding advantages over prior devices. The most important of these advantages is that the present conduit coupling device is lightweight, exhibiting in some cases a weight saving of up to sixty-one percent over previous coupling devices of similar conduit size. Although the present coupling device is directed primarily toward the coupling of flareless type conduits, it possesses the added advantage of being readily modified for coupling together conduits having other end configurations, including the flared and beaded end types, simply by changing one of its three basic components. Furthermore, the present coupling device is capable of use as an electrical conduit housing coupling, a fitting for securing and joining conduit sections at bulkheads, a boss fitting for connecting conduits to walls of containers such as aircraft fuel cells, and many other similar uses. Other advantages of this invention reside in a coupling device which is easily and inexpensively manufactured, simple to install and remove, utilizes but a single threaded section, employs a single, common envelope for all three basic types of conduit of a particular outside diameter, compensates for a small amount of conduit misalignment, and will not mar nor scratch the sealing surfaces.

It is, therefore, an object of the present invention to provide an improved fluid conduit coupling device of exceptional lightweight construction which, while being particularly fashioned for connecting flareless end conduit sections, is also subject to modification for coupling conduits having other end configurations.

Another object of this invention is the provision of an improved conduit coupling device which utilizes an envelope having a single threaded section, which may be employed with various conduit end types of predetermined outside diameter.

Still another object resides in the provision of an improved fluid conduit coupling device which is easy and economical to manufacture, and simple to install and remove.

Yet another object is to provide an improved fluid conduit coupling device which can be used as an electrical conduit housing connector, a fitting for securing and joining conduit sections at bulkheads, and a fitting for joining conduits to the walls of containers and the like.

These and other objects and advantages will be apparent to those skilled in the art from the following description of the appended drawings wherein:

FIGURE 1 shows an exploded view of the improved fluid coupling device.

FIGURE 2 is a cross sectional view of the assembled coupling device of FIGURE 1 showing the coupling of flareless type conduit sections.

FIGURE 3 is a cross sectional view of a modification of the coupling device showing the coupling of flared type conduit sections.

FIGURE 4 is a cross sectional view of another modification showing the coupling of beaded type conduit sections.

FIGURE 5 is a cross sectional view of still another modification showing the coupling of electrical wiring housing conduit sections.

FIGURE 6 is a detail showing of the locating ring of the coupling of FIGURE 5.

FIGURE 7 is a cross sectional view of the coupling of FIGURES 1 and 2 showing the joining of conduit sections through a bulkhead.

FIGURE 8 is a cross sectional view of the coupling of FIGURES 1 and 2 showing the joining of a conduit section to the wall of a container.

Referring now to the drawings there is shown generally in FIGURES 1 and 2 the coupling device 10 for connecting flareless end type tubes 11 and 12. The coupling device 10 consists of an external envelope 13, an internal envelope 14, and an insert 15.

External envelope 13 is of cylindrical configuration having at one of its ends an external, hexagonal, wrenching surface 16. Internally, at the same end as said wrenching surface 16, external envelope 13 is provided with an internal shoulder 17. At the opposite end the envelope 13 is tapped with internal threads 18.

Internal envelope 14 is also of cylindrical shape and has at one end an external, hexagonal, wrenching surface 19. At the same end there is provided an internal shoulder 20. The envelope 14 is further fabricated with external or male threads 21 such as will engage female threads 18 of external envelope 13.

The insert 15 is generally a cylindrically shaped ring and has internal beveled surfaces 22 at its ends. Centrally located with respect to the ends of insert 15 and in spaced relationship with the beveled surfaces 22 there is formed within the insert an integral, annular flange portion which has an inwardly protruding annular surface 23 and radially extending side surfaces 24.

The coupling operation is accomplished by placing the external envelope 13 and internal envelope 14 on the flareless tubes 11 and 12, respectively. Next shouldered sleeves 25 and 26 are placed upon tubes 11 and 12, respectively, and secured thereto at a predetermined distance from the ends of the tubes 11 and 12 by swaging. The sleeves 25 and 26 are cylindrical in shape having external annular shoulders 27 and 28 and internal, annular, inwardly extending edges 29 and 30. The edges 29 and 30 are forced into the material of tubes 11 and 12 as shown in FIGURE 2, thereby preventing inadvertent movement of said sleeves 25 and 26 toward their respective tube ends.

When the above has been accomplished, insert 15 is positioned between tubes 11 and 12, and threads 18 of external envelope 13 are engaged with threads 21 of internal envelope 14 and tightened, by means of open-end wrenches or other suitable torquing devices, to a predetermined torque reading, thereby effecting a highly satisfactory, fluid tight seal.

After the coupling operation has been completed the joint appears in cross-section as shown in FIGURE 2. As envelopes 13 and 14 are tightened and forced together, shoulder 20 of internal envelope 14 abuts against shoulder 28 of sleeve 26, shoulder 17 of external envelope 13 abuts against shoulder 27 of sleeve 25, sleeves 25 and 26 abut against beveled surface 22 of insert 15, and tubes 11 and 12 abut against surface 24 of insert 15, thereby providing sealing surfaces 31, 32, 33 and 34.

In FIGURE 3 there is illustrated a modification of the present coupling device for connecting flared end type conduit sections. In this modification two of the three basic components, namely, envelopes 13 and 14 are the same as those shown in FIGURE 1 and described above. The third basic component, insert 35, is of cylindrical configuration having an external, annular, ridgelike protuberance 36 on both ends thereof as shown. The outer faces 37 of ridges 36 are formed such that said faces 37 mate with flares 38 of tubes 39.

The coupling operation is effected by placing envelopes 13 and 14 over tubes 39. Next, sleeves 40 are placed over tubes 39. Said sleeves 40 are cylindrical in shape and have shoulders 41, against which envelopes 13 and 14 press, and shoulder 42, which imparts pressure to flare 38 of tube 39. Flare 38 is then formed by suitable means. Insert 35 is placed between tubes 39, threads 18 and 21 of envelopes 13 and 14, respectively, are engaged and tightened as described above. When the coupling operation is complete, a high quality, leakproof couple is obtained at sealing surfaces 43 and 44.

FIGURE 4 shows another modification of the present invention for joining beaded end type conduits. As in the case of the flared end type conduit section coupling, the coupling operation is accomplished by means of using the two envelopes 13 and 14. In conjunction therewith, a third type insert 45 is employed. The insert 45 is merely a cylinder having internal beveled surfaces 46 on both ends. In this case a pair of O rings 47 of rubber or other suitable material are also used.

The connecting operation is accomplished by placing envelopes 13 and 14 over tubes 48 and forming beads 49 with conventional beading tools. O rings 47 are next placed, as shown, and insert 45 is positioned between tubes 48. Threads 18 of outer envelope 13 are then engaged with threads 21 of inner envelope 14 and tightened together in the manner described above. This having been done, a fluid tight, leakproof seal is obtained at sealing surface 50 between O ring 47 and surface 46 of insert 45, and at sealing surface 51 between O ring 47 and beads 49.

In FIGURES 5 and 6 there is illustrated still another modification of the coupling device for joining electrical conduit housing tubes 52 and 53. In this modification, envelopes 13 and 14 are employed with insert 54. The insert 54 is essentially the same as insert 15 of FIGURE 1, with the exception that the insert 54 is fabricated with threads 55, as shown, for the acceptance of threaded, radial protrusions 57 of locating ring 56. The locating ring 56 also has internal threads 58 for the acceptance of threaded electrical plug cover 59. The plug cover 59 is attached to electrical conduit 60, which contains wires 61, and communicates with another plug cover 62, which is attached to another electrical conduit 63. As shown, electrical conduits 60 and 63 are positioned in the center of housing tubes 52 and 53, thereby leaving an interspace 64 about said electrical conduits 60 and 63. Said interspace 64 may be used for pressurization in order to prevent electrical current "leakage" under decreased pressures, such as those encountered at high altitudes by aircraft, missiles, and space craft, and for cooling or heating purposes by passing gases through interspace 64 as indicated by the arrows.

The coupling operation is accomplished by locating electrical conduits 60 and 63 within housing tubes 52 and 53. The housing tube 53 is provided with a compressible bellows 53a to facilitate joining and disjoining of said housing tubes 52 and 53 by allowing for linear movement of tube 53. Envelopes 13 and 14 are next placed in position on tubes 52 and 53. Then sleeves 25 and 26 are securely located as previously described. Insert 54, with locating ring 56 positioned therein, is next placed, as shown. Tube 52 is then brought into position and plug housing 62 is screwed onto plug housing 59. Envelopes 13 and 14 are then threadedly secured together as previously described, thereby completing the coupling operation and providing a very high quality conduit joint.

FIGURE 7 illustrates the coupling device of FIGURES 1 and 2 adapted to join conduit sections through bulkheads. In this application external envelope 13 and flareless end type insert 15 are employed in conjunction with internal envelope 65. The envelope 65 has external or male threads 66, an external hexagonal gripping surface 67, and an internal shoulder 68. The coupling operation is accomplished by placing envelopes 13 and 65 over flareless end tubes 11 and 12, locating and securing sleeves 25 and 26 to the tubes 11 and 12 in a manner described above. Tube 12 and envelope 65 are then inserted through aperture 69 in bulkhead 70 and jam nut 71 is positioned about said envelope 65 and tightened as shown, thereby securing the tube 12 and envelope 65 to bulkhead 70. Insert 15, tube 11 with sleeve 25 secured thereto, and envelope 13 are properly located in relation to tube 12 and threads 18 and 66 of envelopes 13 and 65 are then engaged and tightened as hereinabove described. When this coupling procedure is complete, tubes 11 and 12 are coupled in a leakproof fashion and rigidly secured to bulkhead 70.

Although only the coupling device for joining flareless end type conduits through a bulkhead has been disclosed in FIGURE 7, it is to be understood that the same efficient coupling of the conduits illustrated in FIGURES 3, 4 and 5 can be accomplished simply by substituting for the insert 15 the insert appropriate to the type of conduits to be joined.

FIGURE 8 illustrates the coupling device of FIGURES 1 and 2 adapted to connect a flareless end type conduit 11 to the wall 72 of a container or the like, not shown. In this application two of the basic components, namely, the internal envelope and the insert are integrated to form a single boss fitting 73 which has a threaded section 74, an internal shoulder 75 for locating conduit 11 as shown and an internal beveled surface 76. On the opposite end from said beveled surface 76, boss 73 is provided with an annular flange 77.

The joining operation is accomplished by welding boss 73 within an aperture 78 in wall 72 as shown, placing tube 11 and envelope 13 in position to engage threads 13 of envelope 13 with threads 74 of boss 73, and tightening to the desired torque value as described above.

Although only the coupling device for connecting the flareless end type conduit has been disclosed in FIGURE 8, it is to be understood that the same high-quality, efficient coupling of the conduits illustrated in FIGURES 3, 4 and 5 may be accomplished simply by integrating the appropriate insert and internal envelope. It is to be further understood that the bulkhead connector, FIGURE 7 and the boss fitting connector, FIGURE 8, may easily be adapted for containing, pressurizing, cooling or heating electrical conduit, in a manner generally similar to that shown in FIGURE 5 and heretofore described.

As thus described the present invention constitutes a novel, improved, lightweight conduit coupling device for connecting flareless type conduit, which is also well adapted for joining conduits of various end configurations.

Although only the preferred embodiments and modifications of the present invention have been herein disclosed, it is to be understood that the invention is not limited thereto, as many variations will be apparent to those skilled in the art, and the invention is to be given its broadest possible interpretation within the terms of the following claim.

What I claim is:

A coupling for conduits of the flareless end type comprising a cylindrical ring member, internal beveled surfaces at the ends of said ring member, an integral annular flange portion centrally disposed within said ring member against which a pair of conduits to be joined abut, said flange portion being in spaced relationship with said beveled surfaces and having a threaded surface, a locating ring member having a plurality of threaded radial protrusions adapted to engage said threaded surface, said locating ring member being internally threaded for the reception of the threaded ends of tubing positioned within the conduits, a pair of sleeve members, each of which has an internal annular inwardly extending edge at one end and an external annular shoulder intermediate its ends, said sleeve members each being adapted to be positioned on one of the conduits with its one end in engagement with one of said beveled surfaces, a pair of cylindrically shaped envelope members embracing said ring member and the conduits in spaced relationship therewith, each of said envelope members having a wrenching surface at one of its ends and an internal shoulder adapted to engage one of said external annular shoulders, and mutually cooperating thread means on the other ends of said envelope members for drawing said envelope members together when said wrenching surfaces are wrenched to contract said sleeve members between said beveled surfaces and the conduits to force said edges into the conduits and provide fluid tight coupling of the conduits.

References Cited in the file of this patent

UNITED STATES PATENTS

| | | |
|---|---|---|
| 294,977 | Eberhardt | Mar. 11, 1884 |
| 1,670,219 | Smith | May 15, 1928 |
| 1,793,455 | Buchanan | Feb. 24, 1931 |
| 2,417,536 | Wurzburger | Mar. 18, 1947 |
| 2,493,996 | Parmesan | Jan. 10, 1950 |
| 2,522,785 | Hanson | Sept. 19, 1950 |
| 2,695,796 | Woodling | Nov. 30, 1954 |
| 2,761,705 | Kreidel | Sept. 4, 1956 |
| 2,871,032 | Woodling | Jan. 27, 1959 |

FOREIGN PATENTS

| | | |
|---|---|---|
| 704,976 | France | Jan. 27, 1930 |